(12) United States Patent
Grusy et al.

(10) Patent No.: US 10,108,362 B2
(45) Date of Patent: *Oct. 23, 2018

(54) VALIDATION OF STORAGE ARRAYS BASED ON INFORMATION STORED IN GLOBAL METADATA

(71) Applicant: International Business Machines Corporation, Armonk, NY (US)

(72) Inventors: Ellen J. Grusy, Tucson, AZ (US); Kurt A. Lovrien, Tucson, AZ (US); Karl A. Nielsen, Tucson, AZ (US); Jacob L. Sheppard, Queen Creek, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 14/869,844

(22) Filed: Sep. 29, 2015

(65) Prior Publication Data

US 2016/0019003 A1  Jan. 21, 2016

Related U.S. Application Data

(63) Continuation of application No. 13/655,067, filed on Oct. 18, 2012, now Pat. No. 9,207,868.

(51) Int. Cl.
*G06F 15/177* (2006.01)
*G06F 3/06* (2006.01)

(52) U.S. Cl.
CPC ............ *G06F 3/0632* (2013.01); *G06F 3/067* (2013.01); *G06F 3/0619* (2013.01); *G06F 3/0689* (2013.01)

(58) Field of Classification Search
CPC ...... G06F 3/0619; G06F 3/0632; G06F 3/067; G06F 3/0689
See application file for complete search history.

(56) References Cited

U.S. PATENT DOCUMENTS 5,950,230 A   9/1999  Islam et al.
6,411,967 B1  6/2002  Van Renesse
(Continued)

FOREIGN PATENT DOCUMENTS

| CN | 1499362 | 5/2004 |
|---|---|---|
| CN | 101231602 | 7/2008 |
| CN | 101256471 | 9/2008 |

OTHER PUBLICATIONS

U.S. Appl. No. 14/882,240, filed Oct. 13, 2015.
(Continued)

*Primary Examiner* — Fahmida Rahman
(74) *Attorney, Agent, or Firm* — Rabindranath Dutta; Konrad Rayes Davda & Victor LLP

(57) ABSTRACT

A director node of a plurality of nodes determines a plurality of data arrays, where the plurality of data arrays have been discovered at boot time. The director node determines global metadata information, based on reading boot sectors of at least one of the plurality of data arrays discovered at boot time. A determination is made from the global metadata information as to how many data arrays had been previously configured. In response to determining that the plurality of data arrays discovered at boot time is not equal in number to the previously configured data arrays, the director node determines that all configured data arrays have not been discovered.

18 Claims, 7 Drawing Sheets

(56) References Cited

U.S. PATENT DOCUMENTS

| | | |
|---|---|---|
| 6,985,971 B2 | 1/2006 | Wang et al. |
| 7,200,840 B2 | 4/2007 | Gschwind et al. |
| 7,323,707 B2 | 1/2008 | Dennison |
| 7,444,360 B2 | 10/2008 | Frondozo et al. |
| 7,500,020 B1 | 3/2009 | Kabra et al. |
| 7,546,412 B2 | 6/2009 | Ahmad et al. |
| 7,783,917 B2 | 8/2010 | Sheppard et al. |
| 7,788,526 B2 | 8/2010 | O'Connor |
| 7,788,530 B2 | 8/2010 | Kahler et al. |
| 7,945,730 B2 | 5/2011 | Daftardar |
| 8,001,104 B2 | 8/2011 | Frondozo et al. |
| 2002/0073268 A1 | 6/2002 | Peloquin et al. |
| 2003/0149753 A1 | 8/2003 | Lamb |
| 2004/0073659 A1 | 4/2004 | Rajsic et al. |
| 2007/0073268 A1 | 3/2007 | Goble et al. |
| 2008/0005470 A1 | 1/2008 | Davies |
| 2008/0209253 A1 | 8/2008 | Sheppard et al. |
| 2008/0313416 A1 | 12/2008 | Frondozo et al. |
| 2008/0320226 A1 | 12/2008 | Blake et al. |
| 2010/0281163 A1 | 11/2010 | Shi et al. |
| 2011/0106886 A1 | 5/2011 | Nolterieke et al. |
| 2011/0185137 A1 | 7/2011 | Nielsen et al. |
| 2011/0196828 A1 | 8/2011 | Drobychev et al. |
| 2011/0289071 A1 | 11/2011 | Gangadhar |
| 2014/0115253 A1 | 4/2014 | Grusy et al. |
| 2014/0115309 A1 | 4/2014 | Grusy et al. |

OTHER PUBLICATIONS

Office Action dated Nov. 5, 2015, pp. 19. for U.S. Appl. No. 14/882,240, filed Oct. 13, 2015.
Response dated Jan. 29, 2016, pp. 8, to Office Action dated Nov. 5, 2015, pp. 19. for U.S. Appl. No. 14/882,240, filed Oct. 13, 2015.
Notice of Allowance dated Feb. 18, 2016, pp. 5, for for U.S. Appl. No. 14/882,240, filed Oct. 13, 2015.
Luo, et al., "Study on the Synchronizing Mechanism of Node's Metadata Catalog Service", IEEE, 2009, pp. 877-881.
Roussopoulos, et al., "CUP: Controlled Update Propagation in Peer-to-Peer Networks", USENIX 2003 Annual Technical Conference, San Antonio Texas, pp. 1-14.
English translation of CN1499362 dated May 26, 2004.
English translation of CN101231602 dated Jul. 30, 2008.
English translation of CN101256471 dated Sep. 3, 2008.
US Patent Application, dated Oct. 18, 2012, for U.S. Appl. No. 13/655,058, filed Oct. 18, 2012, invented by Ellen J. Grusy et al. Total 31 pages.
Office Action, dated Jul. 28, 2014, for U.S. Appl. No. 13/655,058, filed Oct. 18, 2012, invented by Ellen J. Grusy et al. Total 26 pages.
Response to Office Action, dated Oct. 28, 2014, for U.S. Appl. No. 13/655,058, filed Oct. 18, 2012, invented by Ellen J. Grusy et al. Total 12 pages.
Final Office Action, dated Nov. 21, 2014, for U.S. Appl. No. 13/655,058, filed Oct. 18, 2012, invented by Ellen J. Grusy et al. Total 19 pages.
Response to Final Office Action, dated Feb. 23, 2015, for U.S. Appl. No. 13/655,058, filed Oct. 18, 2012, invented by Ellen J. Grusy et al. Total 13 pages.
Notice of Allowance, dated Mar. 13, 2015, for U.S. Appl. No. 13/655,058, filed Oct. 18, 2012, invented by Ellen J. Grusy et al. Total 9 pages.
Notice of Allowance, dated Jun. 16, 2015, for U.S. Appl. No. 13/655,058, filed Oct. 18, 2012, invented by Ellen J. Grusy et al. Total 9 pages.
US Patent Application, dated Oct. 18, 2012, for U.S. Appl. No. 13/655,067, filed Oct. 28, 2012, invented by Ellen J. Grusy et al., Total 30 pages.
Office Action, dated Dec. 22, 2014 , for U.S. Appl. No. 13/655,067, filed Oct. 28, 2012, invented by Ellen J. Grusy et al., Total 16 pages.
Response to Office Action, dated Mar. 23, 2015, for U.S. Appl. No. 13/655,067, filed Oct. 28, 2012, invented by Ellen J. Grusy et al., Total 13 pages.
Notice of Allowance, dated Mar. 23, 2015, for U.S. Appl. No. 13/655,067, filed Oct. 28, 2012, invented by Ellen J. Grusy et al., Total 28 pages.
PCT International Search Report and Written Opinion dated Mar. 20, 2014 for Application No. PCT/IB2013/058886, filed 2013-09-26T).
PCT International Search Report and Written Opinion dated Nov. 25, 2013 for Application No. PCT/EP2013/070089, filed Sep. 26, 2013.
Notice of Allowance, dated Sep. 14, 2015, for U.S. Appl. No. 13/655,058, filed Oct. 18, 2012, invented by Ellen J. Grusy et al. Total 9 pages.

VALIDATION OF STORAGE ARRAYS BASED ON INFORMATION STORED IN GLOBAL METADATA

CROSS-REFERENCE TO RELATED APPLICATION

This application is a continuation of U.S. patent application Ser. No. 13/655,067 filed Oct. 18, 2012, now U.S. Pat. No. 9,207,868, which application is incorporated herein by reference in its entirety.

BACKGROUND

1. Field

The disclosure relates to a method, system, and article of manufacture for the validation of storage arrays based on information stored in global metadata.

2. Background

In certain computing environments, a plurality of computational devices may control a plurality of storage devices. The storage devices may comprise hard disk drives, solid state disks, optical disks, etc., and may be configured as a Direct Access Storage Devices (DASD), Redundant Array of Independent Disks (RAID), Just a Bunch of Disks (JBOD), etc.

In such computing environments, system metadata may be maintained in local storage, where in certain situations the system metadata may be needed to determine the configuration of the components of the computing environment. The system metadata may be referred to as global metadata. If the global metadata is corrupted, invalid or unavailable, then the components of the computing environment may have to be reconfigured, potentially resulting in data loss.

SUMMARY OF THE PREFERRED EMBODIMENTS

Provided are a method, a system, and a computer program product in which a director node of a plurality of nodes determines a plurality of data arrays, wherein the plurality of data arrays have been discovered at boot time. The director node determines global metadata information, based on reading boot sectors of at least one of the plurality of data arrays discovered at boot time. A determination is made from the global metadata information as to how many data arrays had been previously configured. In response to determining that the plurality of data arrays discovered at boot time is not equal in number to the previously configured data arrays, the director node determines that all configured data arrays have not been discovered.

In further embodiments, in response to determining that the plurality of data arrays discovered at boot time is equal in number to the previously configured data arrays, the director node determines that all configured data arrays have been discovered.

In yet further embodiments, in response to determining that all configured data arrays have been discovered, the director node selects a current set of global metadata arrays that includes metadata for system configuration and the number of previously configured data arrays.

In additional embodiments, in response to determining that all configured data arrays have not been discovered, the director node transmits an indication of an error condition.

In certain embodiments, the global metadata information is not stored in the boot sector, and pointers in the boot sectors point to the global metadata information.

In additional embodiments, discovering of the plurality of data arrays at boot time is performed via a plurality of adapters that couple the plurality of nodes to the plurality of data arrays, where the plurality of adapters communicate information about the plurality of data arrays to corresponding local nodes of the plurality of nodes, and where the local nodes broadcast the information to other nodes of plurality of nodes.

BRIEF DESCRIPTION OF THE DRAWINGS

Referring now to the drawings in which like reference numbers represent corresponding parts throughout.

DETAILED DESCRIPTION

Figure 1:
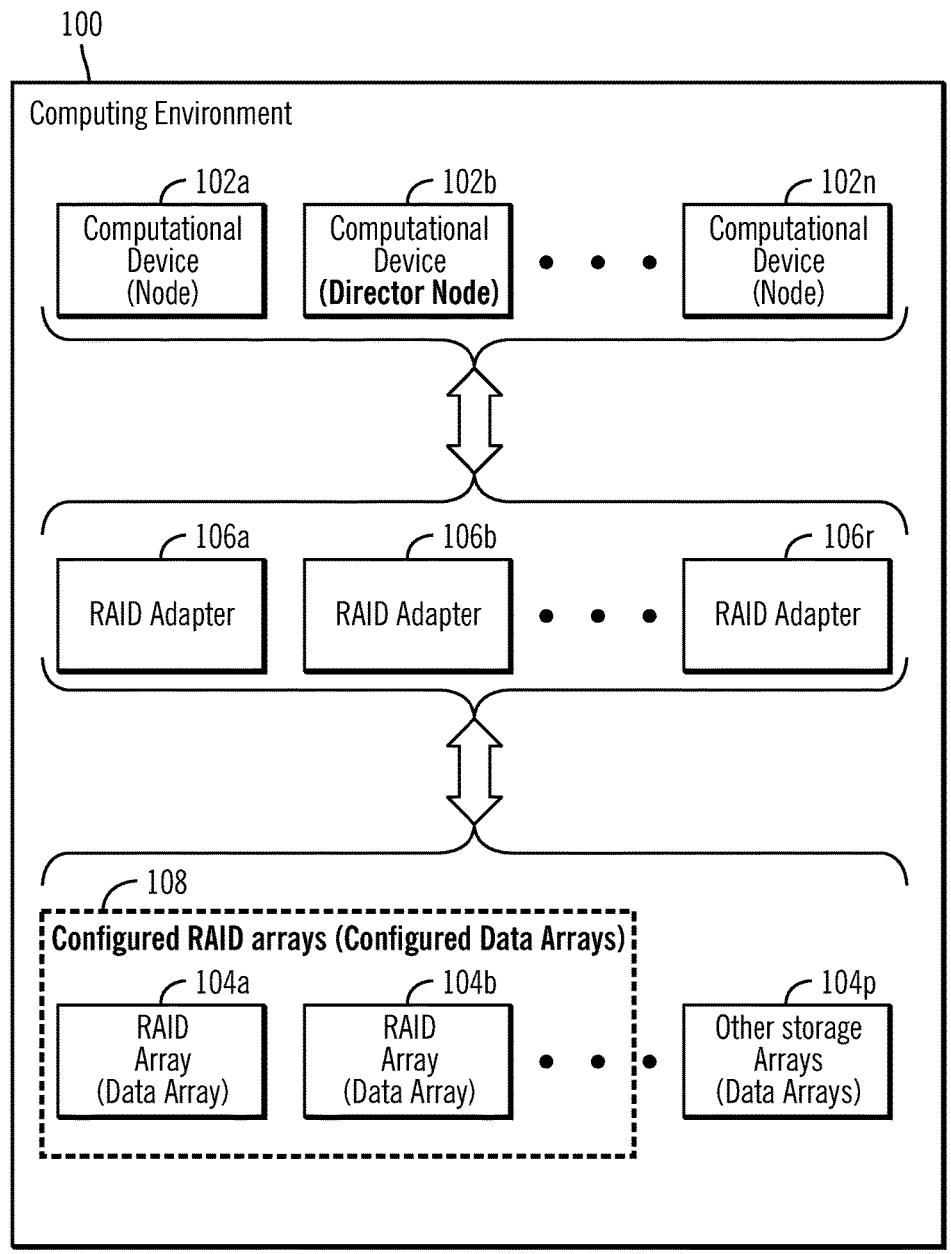
FIG. 1 illustrates a block diagram of a computing environment that includes a plurality of nodes coupled to a plurality of data arrays via a plurality of adapters, where certain of the plurality of data arrays have been configured as RAID arrays, in accordance with certain embodiments.

In the following description, reference is made to the accompanying drawings which form a part hereof and which illustrate several embodiments. It is understood that other embodiments may be utilized and structural and operational changes may be made.

In a storage subsystem, global metadata may be stored persistently in a reserved area in order to preserve the memory of volumes, ranks, logical subsystems, copy service relationships, cache bitmaps, and other entities in the system. Reserved space is allocated on every Redundant Array of Independent Disks (RAID) array in the storage subsystem to store global metadata. However, space is used in three RAID arrays (referred to as global metadata arrays) that are selected to store the global metadata. The three RAID arrays (global metadata arrays) are also referred to as a primary, a secondary and a tertiary RAID array. If a global metadata array fails or a better array becomes available than one in the current set of global metadata arrays, a new global data array is selected to store global metadata in its reserved area. When a new global data array is selected, the set of global metadata is copied to the new RAID array from one of the existing global metadata arrays.

At system start up time, a determination may be made as to which three arrays contain the current set of global metadata tracks in their reserved areas. To aid in global metadata array determination, the list of current primary, secondary, and tertiary array serial numbers, and the time stamp and reconfiguration counts are stored in multiple places in the system, in pointer records. This "pointer" record containing global metadata array serial numbers, reconfiguration count and timestamp may be stored in the last sector, known as the boot sector, of each current global metadata array.

As global metadata reassignments occur under less than ideal situations, global metadata pointer records may become out of date. While any single pointer record does not provide enough evidence to select the set of global metadata arrays since it may be stale, in certain situations, multiple pointer records can provide adequate proof. An example in which global metadata pointers may be out of date occurs if a global metadata array fails while one processing unit is not operational, and a global metadata reassignment is performed. This leads to a situation where one or more processing units in a multi-node system may have out of date global metadata pointer records.

Furthermore, as arrays are removed from the current set of global metadata arrays, their boot sectors are invalidated so that they may not be selected in a future boot sequence. However, when an array fails, it may not be possible to immediately invalidate its boot sector, so at boot time, many arrays may point to themselves as being in the current set of global metadata.

Certain embodiments provide mechanisms for maintaining global metadata in three RAID arrays of a plurality of RAID arrays, where the three RAID arrays have a pointer record in the boot sector that includes pointers to each of the three RAID arrays, reconfiguration counts, and timestamps. In certain embodiments, the global metadata stores the number of RAID arrays that have been configured previously by a user. A director node of the plurality of nodes determines how many RAID arrays have been discovered at boot time, where the discovery of the RAID arrays is performed via direct or indirect communication with RAID adapters and other nodes. The director node determines whether of not the number of RAID arrays discovered at boot time is equal in number to the information on the number of previously configured RAID stored in the metadata. If the two numbers match, then the director node selects the current global metadata arrays from the discovered RAID arrays. If the two numbers do not match, then the director nodes transmits an error condition as all configured RAID arrays have not been discovered, and some of these undiscovered RAID arrays may potentially have the currently valid metadata information.

Exemplary Embodiments

FIG. 1 illustrates a block diagram of a computing environment 100 that includes a plurality of nodes 102a, 102b, . . . 102n coupled to a plurality of data arrays 104a, 104b, . . . 104p, via a plurality of adapters, such as RAID adapters, 106a, 106b, . . . 106r. In certain embodiments, certain of the plurality of data arrays have been configured as RAID arrays (shown via reference numeral 108) by a user.

The nodes 102a . . . 102n may comprise any suitable computational device known in the art, such as a personal computer, a workstation, a server, a mainframe, a hand held computer, a palm top computer, a telephony device, network appliance, etc. While FIG. 1 shows that certain of the plurality of data arrays are RAID arrays, in alternative embodiments the data arrays may comprise any suitable storage devices known in the art, where the suitable storage devices may be configured in other configurations such as DASD, JBOD, etc., that are different from RAID.

Communications in the computing environment 100 may take place via various mechanisms, including communications over a network (not shown), such as a Local Area Network (LAN), a Storage Area Network (SAN), a Wide Area Network (WAN), a wireless network, etc. The plurality of adapters 106a . . . 106r may create dual loops coupling the data arrays 104a . . . 104p to the computational device 102a . . . 102n. Each of the plurality of RAID arrays may include one or more disk components. Each disk component may comprise a data disk, a parity disk, or any other type of disk or component.

In certain embodiments, three RAID arrays of the plurality of data arrays store the global metadata. Three RAID arrays may be used to store the global metadata redundantly. For example, in certain embodiments the global metadata may be mirrored in each of three RAID arrays. While in certain embodiments the data stored in the three RAID arrays include global metadata, in alternative embodiments other types of data or metadata may be stored in the RAID arrays. In certain alternative embodiments, fewer than three or more than three RAID arrays may be used to store the global metadata redundantly. In certain alternative embodiments, only a single RAID array may store the global metadata.

A single node of the plurality of nodes 102a . . . 102n may be referred to as a director node. In FIG. 1, reference numeral 102b shows an exemplary director node. In alternative embodiments, any of the plurality of nodes 102a . . . 102n may be determined to be the director node.

Therefore, FIG. 1 illustrates certain embodiments in which a plurality of nodes including a director node 102b is coupled to a plurality of data arrays via a plurality of adapters. Certain of the data arrays may have been configured previously as RAID arrays by a user, and three of the plurality of configured RAID arrays store the current global metadata in a reserved area.

Figure 2:
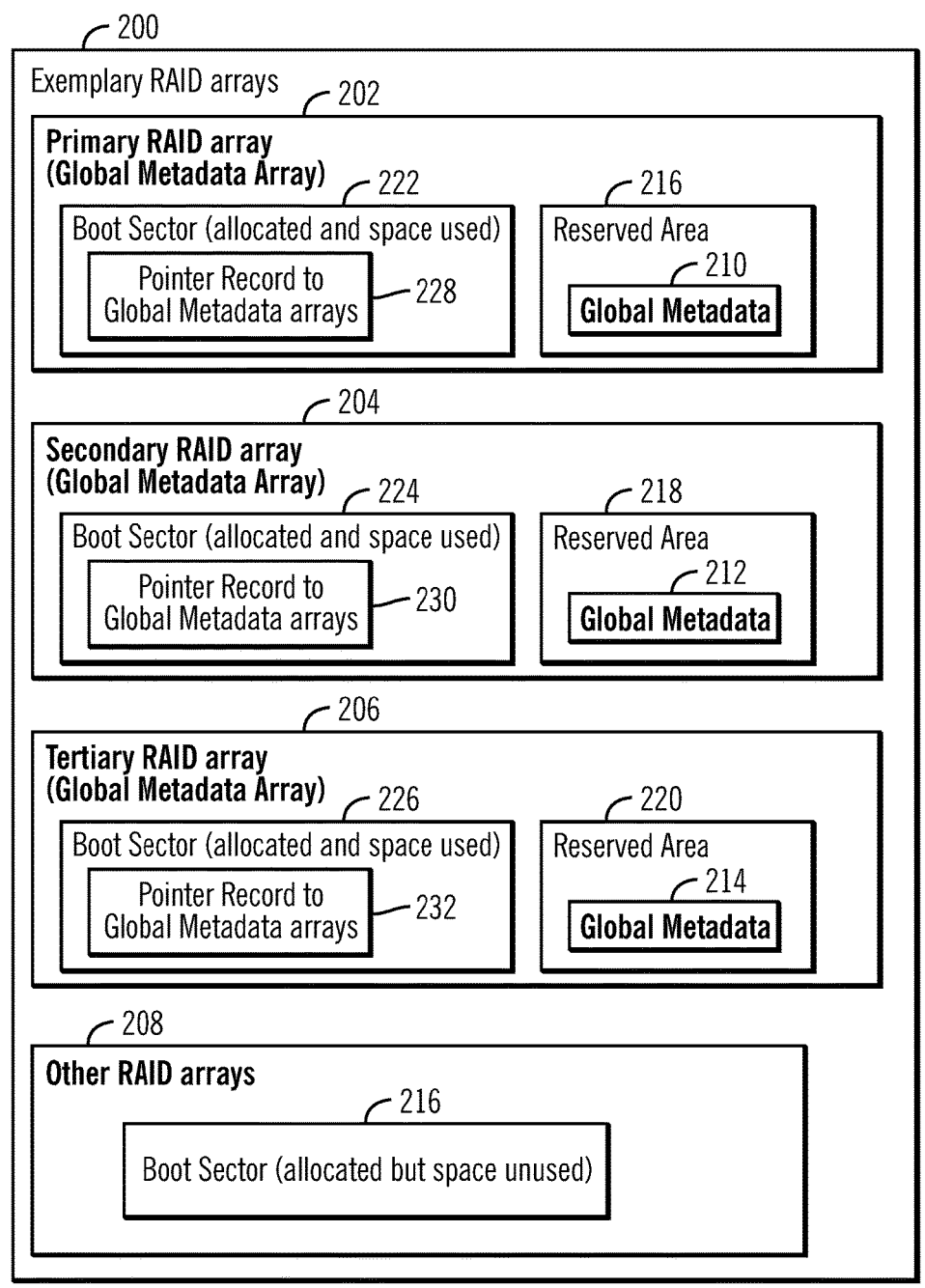
FIG. 2 illustrates a block diagram that shows at least a primary, a secondary, and a tertiary RAID array, in accordance with certain embodiments.

FIG. 2 illustrates a block diagram 200 that shows at least a primary 202, a secondary 204, and a tertiary 206 RAID array, in accordance with certain embodiments. Additional RAID arrays 208 are also shown. The RAID arrays 202, 204, 206, 208 may correspond to the RAID arrays shown in FIG. 1.

The RAID arrays 202, 204, 206 are referred to as primary, secondary, and tertiary RAID arrays respectively. Each of the RAID arrays 202, 204, 206 are also referred to as a global metadata array, as each of the RAID arrays 202, 204, 206 store global metadata 210, 212, 214 in a reserved area 216, 218, 220. In alternative embodiments, there may be a different number of global metadata arrays.

The global metadata arrays 202, 204, 206 each have a boot sector 222, 224, 226 that is allocated, where pointer records 228, 230, 232 pointing to global metadata arrays are stored. The other RAID arrays 208 have a boot sector 216 that is allocated, but space is left unused as no pointer records are stored.

Figure 3:
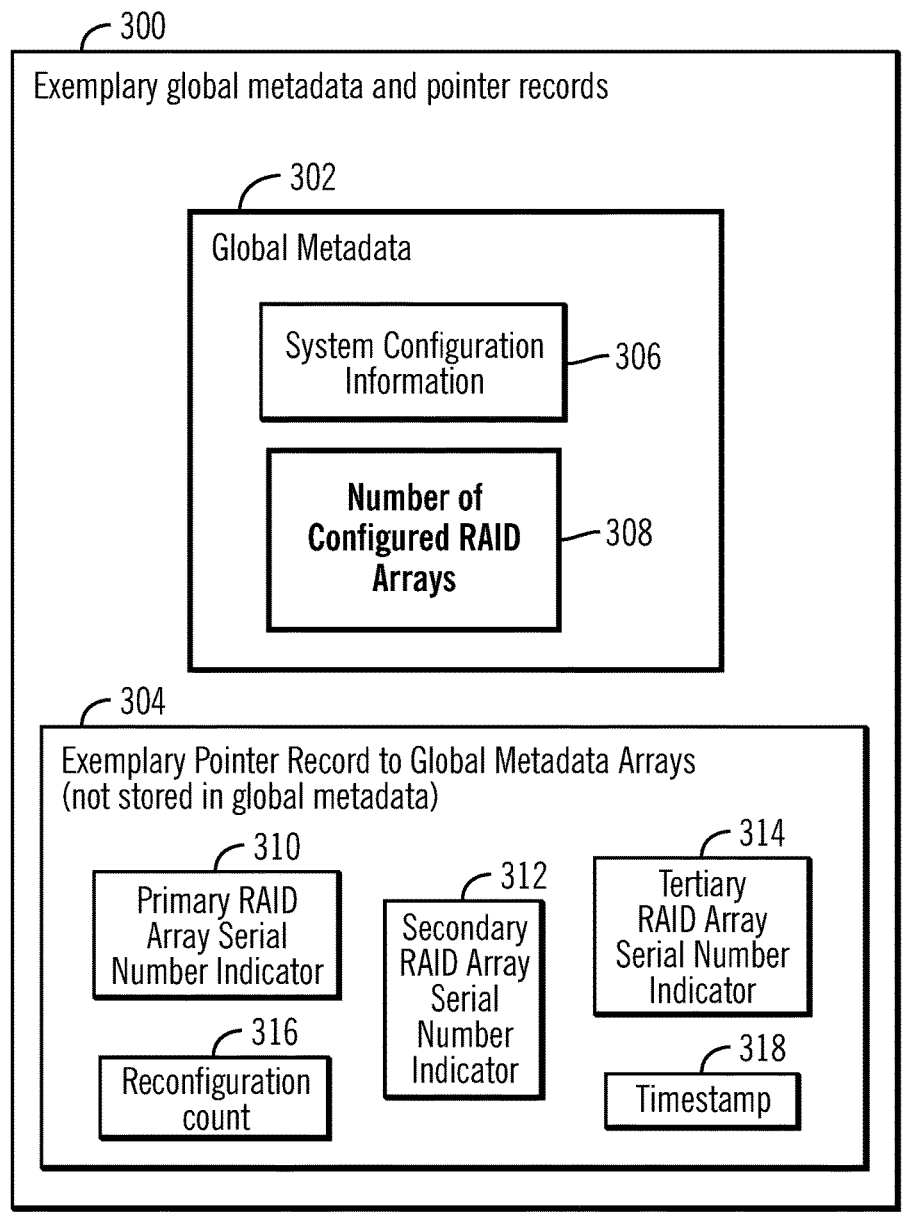
FIG. 3 illustrates a block diagram that shows exemplary global metadata, and an exemplary pointer record in an exemplary boot sector of a RAID array, in accordance with certain embodiments.

FIG. 3 illustrates a block diagram 300 that shows exemplary global metadata 302 stored in a reserved area of a RAID array, and an exemplary pointer record 304 stored in an exemplary boot sector of a RAID array, in accordance with certain embodiments. The exemplary global metadata 302 shown in FIG. 3 may correspond to the exemplary global metadata shown via reference numerals 210, 212, 214 in FIG. 2.

The exemplary global metadata 302 may in certain embodiments have a size allocation of 100 megabytes, in comparison to the boot sector 222, 224, 226 (shown in FIG. 2) which may be of 512 bytes. The global metadata 302 may store system configuration information 306 and the number of configured RAID arrays 308. The number of configured RAID arrays 308 indicates how many RAID arrays have been previously configured by a user. Volume information, RAID rank information, mirrored relationships, copy services information, logical subsystem information, and other information may also be stored in the global metadata 302. The stored system configuration information 306 in combination with other information stored in the global metadata 302 may be used to recover from a system failure.

FIG. 3 also illustrates an exemplary pointer record 304. The pointer record 304 may be stored in an exemplary boot sector of a RAID array. The exemplary pointer record 304 shown in FIG. 3 is not stored in the global metadata.

FIG. 3 shows that the pointer record 304 includes primary, secondary, and tertiary RAID array serial number indicators 310, 312, 314 that point to the primary, secondary, and tertiary RAID arrays (i.e., the global metadata arrays). The reconfiguration count 316 stored in the exemplary pointer record is a counter that is increased when global metadata is updated and the timestamp 318 indicates the time when the global metadata is updated. Since the exemplary pointer record 304 is not stored in the global metadata, the primary, secondary and tertiary RAID array serial number indicators 310, 312, 314, the reconfiguration count 316, and the timestamp 318 are not stored in the global metadata.

In certain embodiments, the location of global metadata array may be changed by copying pointer records from primary, secondary, or tertiary RAID arrays to new RAID arrays. The boot sectors of the old RAID arrays are invalidated, and the global metadata is copied from primary, secondary and/or tertiary RAID arrays to the new RAID arrays and the boots sectors of the new RAID arrays are configured.

In certain embodiments, the director node 102b is selected from the plurality of nodes 102a . . . 102n of FIG. 1. The director node 102b may be determined by executing code in the computing environment 100. In certain embodiments, the director node 102b determines whether a RAID array is a global metadata array and whether the latest version of global metadata is present in the RAID array.

In certain embodiments, a RAID adapter during startup discovers RAID arrays and communicates information regarding the RAID arrays to the local node of the RAID adapter, and the local node broadcasts to other nodes the information regarding the RAID arrays. Code executing in the computing environment 100 determines which of the plurality of nodes is the director node. The director node may be anticipated as having a less processing load or may have better connections to other nodes.

The nodes communicate among themselves to determine the state of different RAID arrays and determine which RAID arrays are to be the global metadata arrays (i.e., the primary, secondary, and tertiary RAID arrays). The director node collects information about each of the RAID arrays from the other nodes, and requests a read of each boot sector and as a result directly or indirectly reads (i.e., logically reads) the boot sector of each RAID array and determines which of the RAID arrays have a pointer record in the boot sector. It may be noted that in certain embodiments the reading may be performed indirectly or directly. For example, in an indirect read the director node makes a request to another node that is directly attached to the RAID array, and that node performs the read and passes the data back to the director node. The director node then determines the boot sectors with highest reconfiguration count or latest timestamps to determine the primary, secondary, and tertiary RAID arrays that store the global metadata. The director node then synchronizes global metadata between primary, secondary, tertiary RAID arrays and configures the components of the computing environment 100 based on the global metadata.

Figure 4:
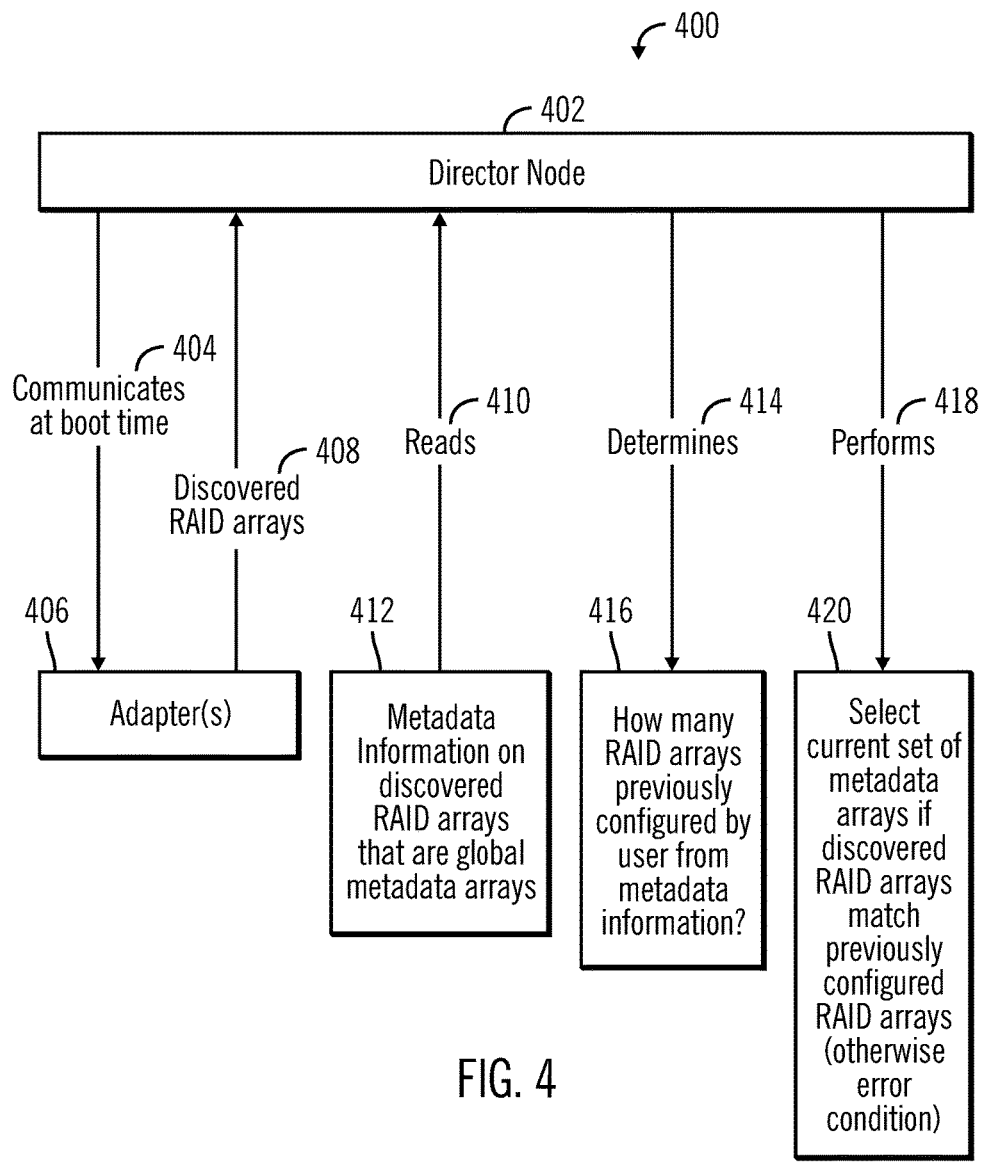
FIG. 4 illustrates a block diagram that shows how a director node validates a set of RAID arrays discovered at boot time, based on information stored in the exemplary global metadata, in accordance with certain embodiments.

FIG. 4 illustrates a block diagram 400 that shows how a director node 402 validates a set of RAID arrays discovered at boot time, based on information stored in the exemplary global metadata, in accordance with certain embodiments.

The director node 402 communicates (reference numeral 404) at boot time with adapters 406, such as RAID adapters 106a . . . 106r. The RAID adapters 406 discover (reference numeral 408) RAID arrays, and the director node 402 determines how many RAID arrays have been discovered. In certain embodiments, discovering of the plurality of data arrays at boot time is performed via a plurality of adapters that couple the plurality of nodes to the plurality of data arrays, where the plurality of adapters communicate information about the plurality of data arrays to corresponding local nodes of the plurality of nodes, and where the local nodes broadcast the information to other nodes of plurality of nodes. The local node is the node which the RAID adapter couples to a RAID array.

The director node 402 then reads (reference numeral 410) the metadata information 412 on the discovered RAID arrays that are global metadata arrays, and determines (reference numeral 414) how many RAID arrays were previously configured by the user (reference numeral 416).

Once the director node 402 has determined how many RAID arrays were previously configured by the user, the director node may perform (reference numeral 418) a selection of the current set of metadata arrays if the discovered RAID arrays match in number the previously configured RAID arrays (reference numeral 420). Otherwise, if the director node determines that the discovered RAID arrays do not match in number the previously configured RAID arrays, then an error condition occurs and the current set of metadata arrays may not be determined correctly as one or more of the current set of metadata arrays may be located in RAID arrays that have not been discovered at boot time.

Figure 5:
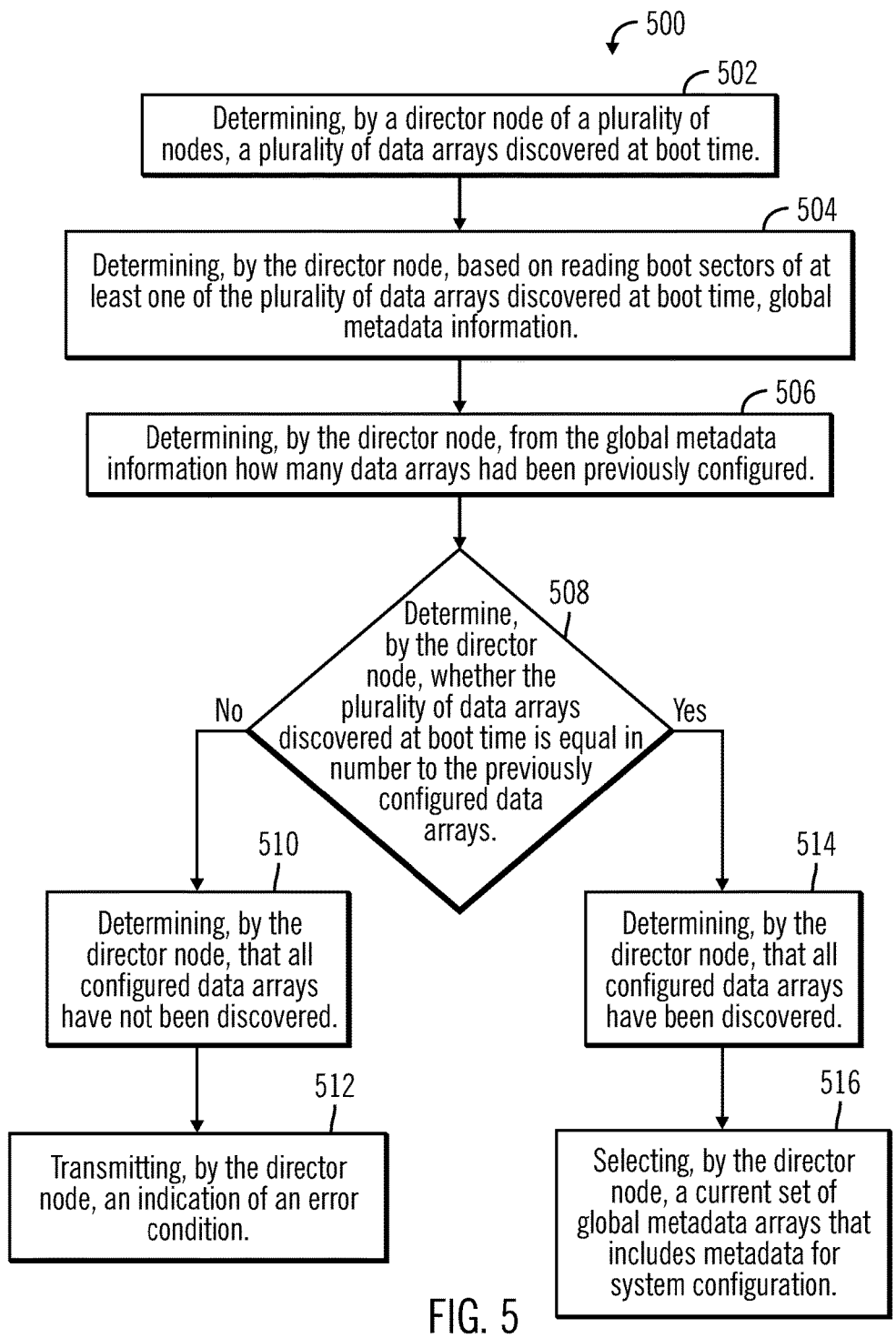
FIG. 5 illustrates a flowchart that shows operations performed in the computing environment, in accordance with certain embodiments.

FIG. 5 illustrates a flowchart 500 that shows operations performed in the computing environment 100, in accordance with certain embodiments.

Control starts at block 502 in which a director node 102b of a plurality of nodes determines a plurality of data arrays, wherein the plurality of data arrays have been discovered at boot time. The director node 102b determines (at block 504) global metadata information, based on reading boot sectors of at least one of the plurality of data arrays discovered at boot time. In embodiments in which a primary and a secondary metadata array are maintained as global metadata arrays, two of the plurality of data arrays may be used to redundantly determine the global metadata information. In embodiments in which a primary, a secondary, and a tertiary metadata array are maintained as global metadata arrays, three of the plurality of data arrays may be used to redundantly determine the global metadata information.

A determination is made (at block 506) from the global metadata information as to how many data arrays had been previously configured. Control proceeds to block 508 in which the director node determines whether the plurality of data arrays discovered at boot time is equal in number to the previously configured data arrays.

In response to determining ("No" branch from block 508) that the plurality of data arrays discovered at boot time is not equal in number to the previously configured data arrays, the director node 102b determines (at block 510) that all configured data arrays have not been discovered. Control proceeds to block 512, in which in response to determining that all configured data arrays have not been discovered, the director node 102b transmits an indication of an error condition.

In further embodiments, in response to determining ("Yes" branch from block 508) that the plurality of data arrays discovered at boot time is equal in number to the previously configured data arrays, the director node determines (at block 514) that all configured data arrays have been discovered.

In yet further embodiments, in response to determining that all configured data arrays have been discovered, control proceeds to block 516 in which the director node 102b selects a current set of global metadata arrays that includes metadata for system configuration and the number of previously configured data arrays.

In additional embodiments, discovering of the plurality of data arrays at boot time is performed via a plurality of adapters that couple the plurality of nodes to the plurality of data arrays, where the plurality of adapters communicate information about the plurality of data arrays to corresponding local nodes of the plurality of nodes, and where the local nodes broadcast the information to other nodes of plurality of nodes.

Figure 6:
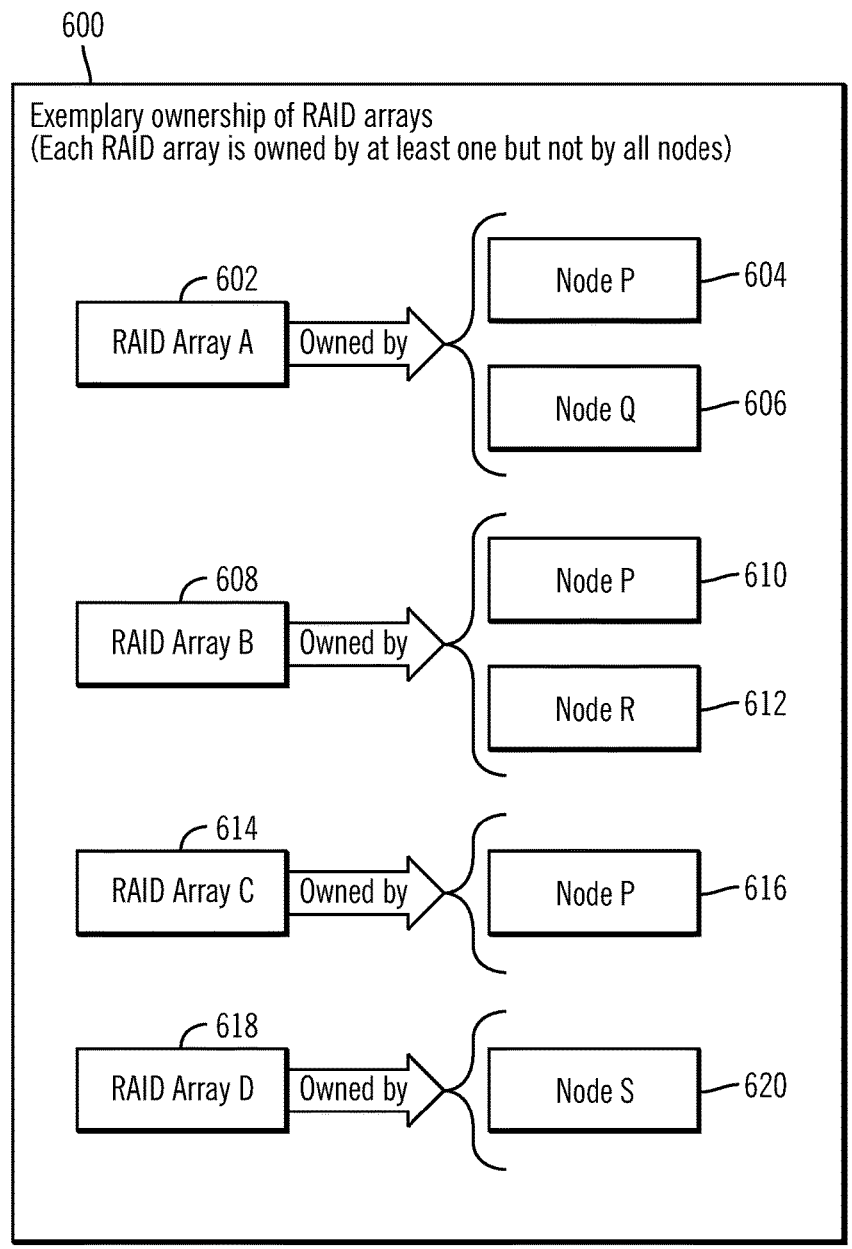
FIG. 6 illustrates a block diagram that shows an exemplary ownership of RAID arrays, in accordance with certain embodiments.

FIG. 6 illustrates a block diagram 600 that shows an exemplary ownership of RAID arrays 602, 608, 614, 618, in accordance with certain embodiments. In FIG. 6, it can be seen that each RAID array is owned by at least one but not by all nodes. In the example, shown in FIG. 6, if node P wants to communicate with RAID array D 618, then node P has to know which adapter owns the RAID array D 618 and which node talks to that adapter. It should be noted that while adapter to array relationship is fixed, adapter to node relationship can vary based on node availability.

It may be noted that in certain embodiments, each RAID array may be connected to more than one adapter. So a given node could possibly have a local adapter and one ore more remote adapters with access to the same RAID array.

Therefore, FIGS. 1-6 illustrate certain embodiments, in which full collaboration of multiple nodes occur in the selection of a global metadata array set during system initialization. Logical connections are established from each node to each array via adapters, enabling reads of boot sectors and error recovery prior to reading rank configuration metadata, Mirroring of resource lists are made among each node enabling uniform selection of the global metadata array. The full array resource list shared among each node is compared against each fully configured rank, to ensure that missing arrays are identified prior to selecting the set of global metadata arrays.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
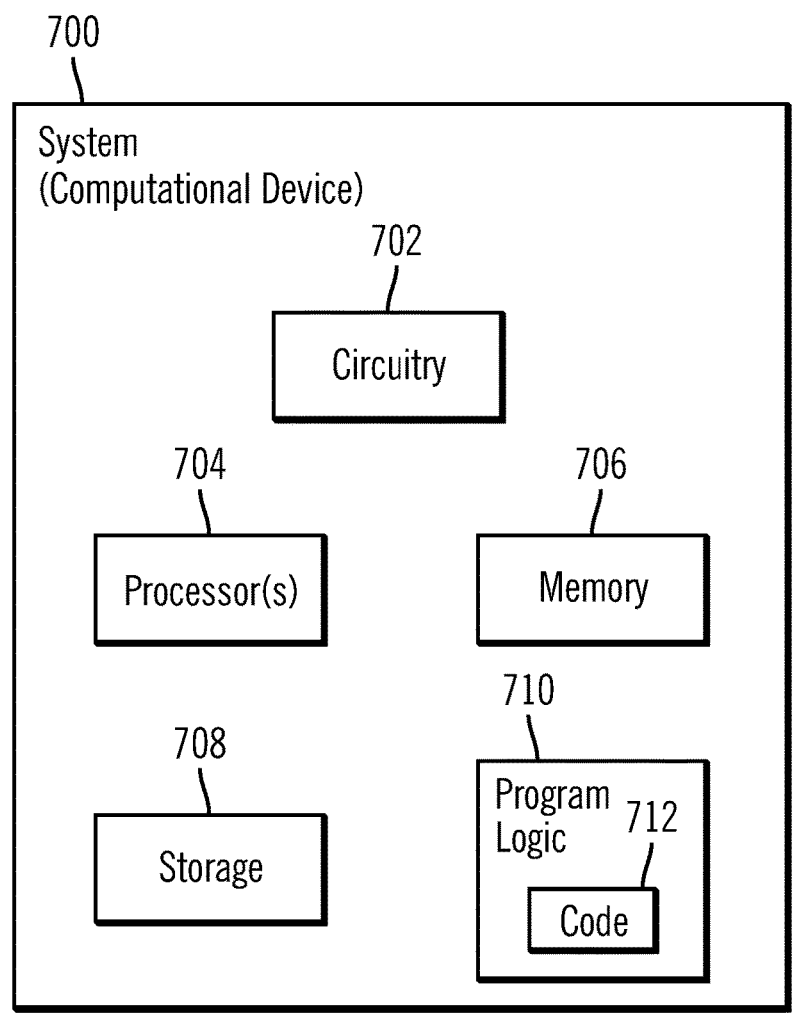
FIG. 7 illustrates a block diagram of a computational system that shows certain elements that may be included in at least the nodes of FIG. 1, in accordance with certain embodiments.

FIG. 7 illustrates a block diagram that shows certain elements that may be included in the nodes 102a . . . 102n or RAID adapters 106a . . . 106r in accordance with certain embodiments. The system 700 may comprise the nodes 102a . . . 102n or RAID adapters 106a . . . 106r and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

maintaining, via a processor, a current set of three global metadata arrays, wherein a boot sector in each of the three global metadata arrays stores pointer records pointing to the current set of the three global metadata arrays, wherein each of the three global metadata arrays stores global metadata information including a number of previously configured data arrays;

determining, by a director node, based on reading boot sectors of at least one of a plurality of data arrays discovered at boot time, the global metadata information that stores the number of previously configured data arrays; and in response to determining that the plurality of data arrays discovered by the director node at the boot time is not equal in number to the number of previously configured data arrays, determining that all configured data arrays have not been discovered;

transmitting an error condition, in response to determining that all configured data arrays have not been discovered, wherein one or more of the configured data arrays that have not been discovered have a currently valid global metadata information; and configuring a computing system, in response to determining that the plurality of data arrays discovered by the director node at the boot time is equal in number to the number of previously configured data arrays and all configured data arrays have been discovered.

2. The method of claim 1, wherein boot sectors of other data arrays besides the global metadata arrays do not store pointer records pointing to the current set of global metadata arrays.

3. The method of claim 2, wherein the three metadata arrays comprise a primary, a secondary, and a tertiary data array.

4. The method of claim 3, wherein the director node synchronizes the global metadata information among the primary, the secondary, and the tertiary data arrays.

5. The method of claim 1, wherein the director node configures components of a computing environment based on the global metadata information.

6. The method of claim 1, wherein a pointer record to global metadata arrays includes serial number indicators of data arrays.

7. A system in communication with a plurality of nodes, the system comprising:
a memory; and
a processor coupled to the memory, wherein the processor performs operations, the operations comprising:
maintaining a current set of three global metadata arrays, wherein a boot sector in each of the three global metadata arrays stores pointer records pointing to the current set of the three global metadata arrays, wherein each of the three global metadata arrays stores global metadata information including a number of previously configured data arrays;

determining, based on reading boot sectors of at least one of a plurality of data arrays discovered at boot time, the global metadata information that stores the number of previously configured data arrays; and in response to determining that the plurality of data arrays discovered at the boot time is not equal in number to the number of previously configured data arrays, determining that all configured data arrays have not been discovered;

transmitting an error condition, in response to determining that all configured data arrays have not been discovered, wherein one or more of the configured data arrays that have not been discovered have a currently valid global metadata information; and configuring a computing system, in response to determining that the plurality of data arrays discovered by the director node at the boot time is equal in number to the number of previously configured data arrays and all configured data arrays have been discovered.

8. The system of claim 7, wherein boot sectors of other data arrays besides the global metadata arrays do not store pointer records pointing to the current set of global metadata arrays.

9. The system of claim 8, wherein the three metadata arrays comprise a primary, a secondary, and a tertiary data array.

10. The system of claim 9, wherein the operations further comprise synchronizing the global metadata information among the primary, the secondary, and the tertiary data arrays.

11. The system of claim 7, wherein the director node configures components of a computing environment based on the global metadata information.

12. The system of claim 7, wherein a pointer record to global metadata arrays includes serial number indicators of data arrays.

13. A computer program product, the computer program product comprising a non-transitory computer readable storage medium having computer readable program code embodied therewith, the computer readable program code configured to perform operations, the operations comprising:
maintaining, via a processor, a current set of three global metadata arrays, wherein a boot sector in each of the three global metadata arrays stores pointer records pointing to the current set of the three global metadata arrays, wherein each of the three global metadata arrays stores global metadata information including a number of previously configured data arrays;

determining, by a director node, based on reading boot sectors of at least one of a plurality of data arrays discovered at boot time, the global metadata information that stores the number of previously configured data arrays; and in response to determining that the plurality of data arrays discovered by the director node at the boot time is not equal in number to the number of previously configured data arrays, determining that all configured data arrays have not been discovered;

transmitting an error condition, in response to determining that all configured data arrays have not been discovered, wherein one or more of the configured data arrays that have not been discovered have a currently valid global metadata information; and configuring a computing system, in response to determining that the plurality of data arrays discovered by the director node at the boot time is equal in number to the number of previously configured data arrays and all configured data arrays have been discovered.

14. The computer program product of claim 13, wherein boot sectors of other data arrays besides the global metadata arrays do not store pointer records pointing to the current set of global metadata arrays.

15. The computer program product of claim 14, wherein the three metadata arrays comprise a primary, a secondary, and a tertiary data array.

16. The computer program product of claim 15, wherein the director node synchronizes the global metadata information among the primary, the secondary, and the tertiary data arrays.

17. The computer program product of claim 13, wherein the director node configures components of a computing environment based on the global metadata information.

18. The computer program product of claim 13, wherein a pointer record to global metadata arrays includes serial number indicators of data arrays.

\* \* \* \* \*